US007382360B2

(12) United States Patent
Mackey et al.

(10) Patent No.: US 7,382,360 B2
(45) Date of Patent: Jun. 3, 2008

(54) METHODS AND SYSTEMS FOR CHANGING THE APPEARANCE OF A POSITION SENSOR WITH A LIGHT EFFECT

(75) Inventors: Bob Lee Mackey, San Jose, CA (US); Shawn P. Day, San Jose, CA (US); Alfred Woo, Milpitas, CA (US); Mark Jennings, San Jose, CA (US)

(73) Assignee: Synaptics Incorporated, Santa Clara, CA (US)

( * ) Notice: Subject to any disclaimer, the term of this patent is extended or adjusted under 35 U.S.C. 154(b) by 345 days.

(21) Appl. No.: 10/417,786

(22) Filed: Apr. 15, 2003

(65) Prior Publication Data

US 2004/0207605 A1    Oct. 21, 2004

(51) Int. Cl.
*G06F 3/041* (2006.01)
*G06F 3/045* (2006.01)
*G06F 3/042* (2006.01)
*G02F 1/1335* (2006.01)
*G02F 1/13* (2006.01)

(52) U.S. Cl. ............... 345/173; 345/174; 345/175; 345/176; 349/62; 349/63; 349/201

(58) Field of Classification Search ............... 345/102, 345/173, 174, 175, 176, 177, 178; 349/59, 349/62, 63, 201
See application file for complete search history.

(56) References Cited

U.S. PATENT DOCUMENTS 4,521,870 A * 6/1985 Babbel et al. ............... 710/316

| | | | |
|---|---|---|---|
| 5,608,550 A * | 3/1997 | Epstein et al. | 349/57 |
| 5,666,113 A * | 9/1997 | Logan | 341/34 |
| 5,670,755 A * | 9/1997 | Kwon | 178/18.05 |
| 5,736,686 A * | 4/1998 | Perret et al. | 178/18.11 |
| 5,742,373 A * | 4/1998 | Alvelda | 349/201 |
| 6,462,941 B1 | 10/2002 | Hulick et al. | |

(Continued)

OTHER PUBLICATIONS

NASA Goddard Space Flight Center, "More About the Relationship Between Intensity and Distance", http://imagine.gsfc.nasa.gov/YBA/M31-velocity/1overR2-more.html.*

(Continued)

*Primary Examiner*—Alexander Eisen
*Assistant Examiner*—Alexander S. Beck
(74) *Attorney, Agent, or Firm*—Ingrassia Fisher & Lorenz, P.C.

(57) ABSTRACT

Methods and systems are provided for producing a light effect on a touchpad or other position sensor. In one aspect, a position sensor for detecting a position of an object suitably includes a sensor, a light source, and a light conductor at least partially located between the sensor and the object. The light conductor is configured to transmit light from the light source to produce a light effect that alters the appearance of the position sensor. Because the light conductor is located between the sensor and the object, the sensor need not be made from transparent or translucent material, thereby significantly reducing the cost of the sensor. In a further aspect, the position sensor includes at least one marking or pattern in proximity to the light conductor such that the marking can be made visible by at least a component of the light to produce an image of a soft control, logo, ornamental design, status indicator or the like.

55 Claims, 9 Drawing Sheets

U.S. PATENT DOCUMENTS

| | | | |
|---|---|---|---|
| 6,560,612 B1 * | 5/2003 | Yamada et al. | 707/104.1 |
| 6,614,422 B1 * | 9/2003 | Rafii et al. | 345/168 |
| 6,680,731 B2 * | 1/2004 | Gerpheide et al. | 345/173 |
| 6,738,051 B2 * | 5/2004 | Boyd et al. | 345/176 |
| 6,757,002 B1 * | 6/2004 | Oross et al. | 715/864 |
| 6,803,905 B1 * | 10/2004 | Capps et al. | 345/173 |
| 6,822,640 B2 * | 11/2004 | Derocher | 345/173 |
| 6,842,170 B1 * | 1/2005 | Akins et al. | 345/173 |
| 2002/0084992 A1 * | 7/2002 | Agnew | 345/173 |
| 2002/0190975 A1 | 12/2002 | Kerr | |
| 2003/0002246 A1 | 1/2003 | Kerr | |
| 2003/0122794 A1 * | 7/2003 | Caldwell | 345/173 |
| 2004/0156192 A1 | 8/2004 | Kerr et al. | |
| 2004/0189612 A1 * | 9/2004 | Bottari et al. | 345/173 |

OTHER PUBLICATIONS

Blue/White UV Ink, "UV Invisible Inks, Ink Pads and Pens", Feb. 2, 2002, http://maxmax.com/aUVBlueInvisibleInks.htm.*
Agilent HSMA/C/L-C120, HSMD/G/S/H-C120, HSMM/N/Q/R-C120 Right Angle ChipLED Data Sheet, Before Apr. 15, 2003.
Light Guide Techniques Using LED Lamps, Application Brief I-003, Agilent Technieques, Jun. 11, 2002.

* cited by examiner

METHODS AND SYSTEMS FOR CHANGING THE APPEARANCE OF A POSITION SENSOR WITH A LIGHT EFFECT

TECHNICAL FIELD OF THE INVENTION

The present invention generally relates to position sensors such as touchpads, and more particularly relates to devices, systems and methods for producing light effects that change the appearance of position sensors.

BACKGROUND OF THE INVENTION

Position sensors are used as input devices for computers, personal digital assistants (PDAs), media players, video game players, consumer electronics, cellular phones, payphones, point-of-sale terminals and the like. One common type of position sensor is the touchpad-type sensor, which can be readily found, for example, as an input device on many notebook-type computers. A user generally operates the touchpad by moving a finger, stylus or other pointer near a sensing surface to move a cursor or other indicator on a display screen. A capacitive or inductive proximity sensor and/or a resistive touch sensor within the device senses the position of the finger or pointer, and suitably relays an electrical and/or electronic indication of the position to the computer or other host. One example of a touchpad that is based on capacitive sensing technologies is described in U.S. Pat. No. 5,880,411, which issued to Gillespie et al. on Mar. 9, 1999. Position sensors have also been combined with liquid crystal display technologies to create touch sensitive displays for notebook-type computers, PDAs, point of sale terminals, automatic teller machines, kiosks and the like.

Although position sensors have been widely adopted, designers continue to look for ways to improve the sensors' appearance and functionality. In particular, difficulties have long been realized in illuminating or otherwise producing light effects on the sensor. Some touch-sensitive displays have been illuminated with backlighting from a fluorescent lamp or other source. This technique has several inherent disadvantages, however, most notably that the sensors used in such devices must typically be made transparent or translucent so that light is able to pass through the sensor to the observer's eye. Although such sensors may be fabricated from materials such as Indium Tin Oxide (ITO), these materials have generally been found to be disadvantageous in terms of cost, manufacturability, design flexibility, performance and the like. Moreover, ITO can be somewhat absorptive, thereby partially obscuring the display. Even further, ITO is frequently subject to wear and cracking in use, thereby limiting the lifetime of the sensor.

Accordingly, it is desirable to provide a position sensor that is capable of producing a light effect that modifies the appearance of the position sensor. In addition, it is desirable to produce the light effect without requiring a transparent or translucent touch sensor. Moreover, it is desirable to create a position sensor that provides position-sensitive soft control and/or status indicator regions without requiring a liquid crystal or other display. Other desirable features and characteristics of the present invention will become apparent from the subsequent detailed description and the appended claims, taken in conjunction with the accompanying drawings and the foregoing technical field and background.

BRIEF SUMMARY OF THE INVENTION

According to various exemplary embodiments, a position sensor for detecting a position of an object suitably includes a sensor for detecting the position of the object, a light source, and a light conductor at least partially located between the sensor and the object. The light conductor is configured to transmit light from the light source to produce a light effect that alters the appearance of the position sensor. Because the light conductor is located between the sensor and the object, the sensor need not be made from transparent or translucent material, thereby significantly reducing the cost of the position sensor. Various further embodiments of the position sensor include at least one marking in proximity to the light conductor such that the marking can be made visible by at least a component of the light to produce an image of a soft control and/or status indicator. Other embodiments include various methods, systems and devices relating to production of an appearance-altering light effect for a position sensor.

BRIEF DESCRIPTION OF THE DRAWINGS

Various aspects of the present invention will hereinafter be described in conjunction with the following drawing figures, wherein like numerals denote like elements.

DETAILED DESCRIPTION OF THE INVENTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, a position sensor is provided with a light source and a light conductor having a light pipe and/or one or more optical fibers. The light conductor suitably transmits light across the position sensor, and light is scattered from the conductor to produce a light effect that is observable by a user and that alters the appearance of the position sensor. Examples of light effects include illuminating the position sensor, flashing a light, changing a color of a light, and the like. Because light is distributed by a light conductor, the light source may be placed in any location, and the need for backlighting is suitably reduced. Moreover, because light can be effectively conducted between the position sensor and the viewer's eye, the position sensor is no longer required to facilitate light transmission. Accordingly, the position sensor does not need to be made from expensive transparent materials, thereby improving the cost and performance of the position sensor. In a further embodiment, light scattering from the conductor can be arranged such that one or more status indicators, "soft buttons" and/or other "soft controls" are created on the sensor without the need for backlighting or separate display functionality.

Although the various embodiments described herein frequently refer to "touchpads", the term "touchpad" as used herein is intended to encompass not only conventional touchpad devices, but also a broad range of equivalent devices that are capable of detecting the position of a finger, pointer, stylus or other object. Such devices may include, without limitation, touch screens, touch pads, touch tablets, biometric authentication devices, handwriting or character recognition devices, and the like. Similarly, the terms "position" or "object position" as used herein are intended to broadly encompass absolute and relative positional information, and also other types of spatial-domain information such as velocity, acceleration, and the like, including measurement of motion in one or more directions. Various forms of positional information may also include time history components, as in the case of gesture recognition and the like. Accordingly, "position sensors" appropriately detect more than the mere presence or absence of an object and may encompass a broad range of equivalents.

Figure 1:
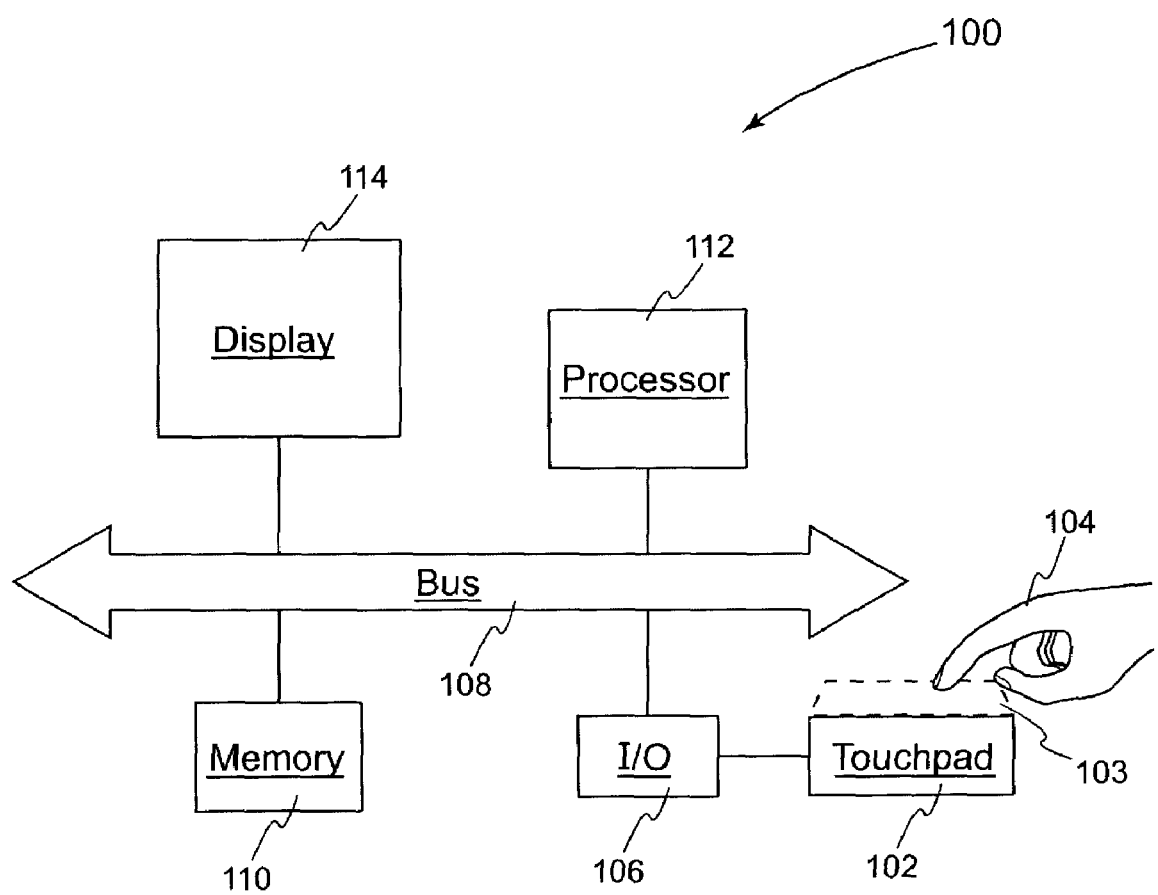
FIG. 1 is a block diagram of an exemplary computing system including a position sensor capable of producing a light effect.

Turning now to the drawing figures, FIG. 1 is a block diagram of an exemplary computing system 100 that includes a touchpad 102 or other position-sensing input device. Computing system 100 is any type of personal computer, portable computer, workstation, personal digital assistant, video game player, telephone, media player or other device capable of accepting input from a user and of processing information. Accordingly, the various embodiments of computing system 100 may include any type of controller or processor 112, memory 110, display 114, and input/output (I/O) interface 106 communicating via a bus 108, network or other interconnection. Touchpad 102 may be connected to system 100 via I/O interface 106 using any type of connection (e.g. a PS/2, Universal Serial Bus (USB) or other type of connection), or may be directly coupled to bus 108 as appropriate.

Touchpad 102 is sensitive to the position of a finger 104, stylus or other object within a sensing region 103. "Sensing region" 103 as used herein is intended to broadly encompass any space above, around, in and/or near touchpad 102 wherein the sensor of the touchpad is able to detect a position of the object. In a conventional embodiment, sensing region 103 extends from the surface of the sensor in one or more directions for a distance into space until signal-to-noise ratios prevent object detection. This distance may be on the order of centimeters or more, and may vary significantly with the type of position sensing technology used and the accuracy desired. Accordingly, the size and exact locations of the particular sensing regions 103 will vary widely from embodiment to embodiment.

In operation, touchpad 102 suitably detects a position of finger 104 or other object within sensing region 103, and provides electrical or electronic indicia of the position to interface 106. Interface 106 suitably forwards the position indicia to processor 112 via bus 108. Processor 112 appropriately processes the indicia to accept inputs from the user, to move a cursor or other object on display 114, or for any other purpose. In a further embodiment, touchpad 102 suitably includes a light source that is capable of creating a light effect that alters the appearance of touchpad 102 in response to instructions from processor 112 and/or interface 106, or as a function of user inputs detected within sensing region 103, as appropriate, and as described more fully below.

Figure 2A:
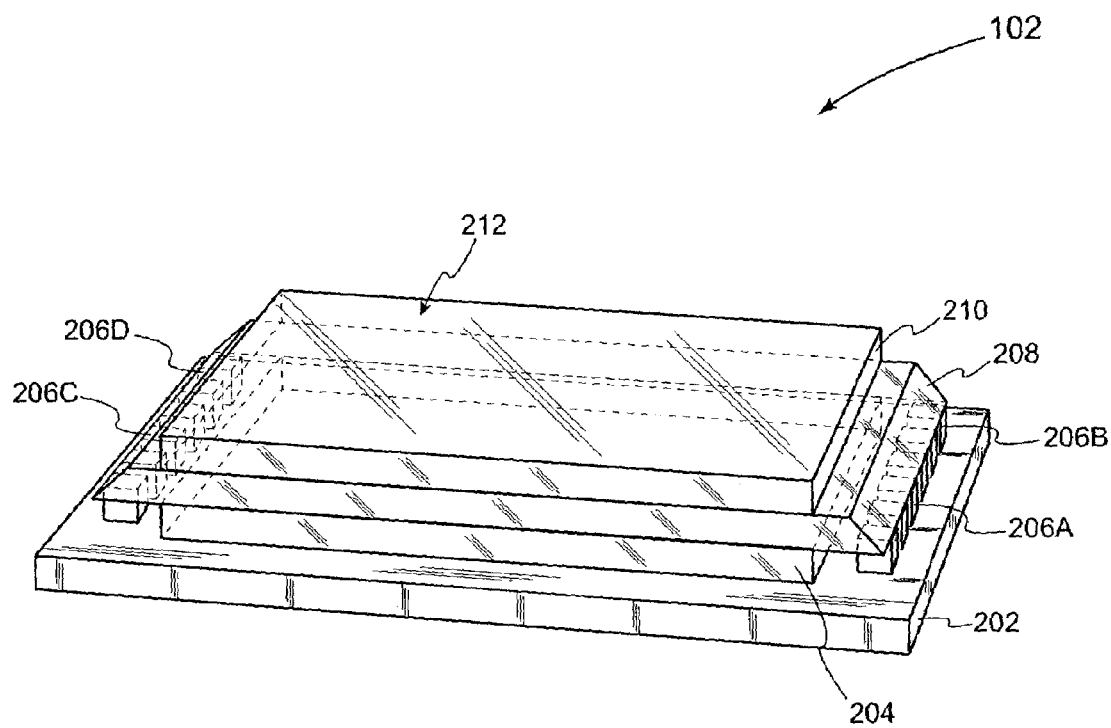
FIGS. 2A-B are perspective and side views, respectively, of an exemplary position sensor.
Figure 2B:
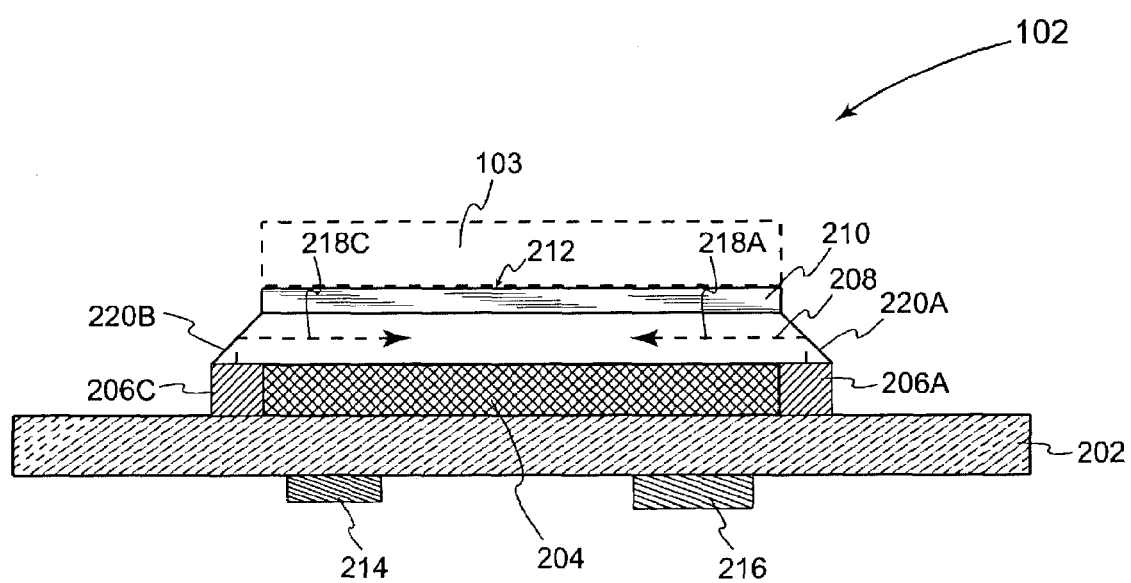

With reference now to FIGS. 2A and 2B, an exemplary touchpad 102 suitably includes a circuit board or other substrate 202 supporting a sensor 204. Touchpad 102 also includes a light source 206 that includes one or more light producers 206A-D, as well as a light conductor 208 for transmitting light across the outer face of sensor 204. The various components of touchpad 102 may be affixed together using any type of adhesive (e.g. epoxy, tape, pressure-sensitive adhesive and/or the like), or using any other joining technique.

Sensor 204 is any capacitive, resistive, inductive or other type of sensor that is capable of detecting the position of a finger, stylus or other object, as described above. Exemplary sensors 204 include the various sensors produced by Synaptics Inc. of San Jose, Calif., which appropriately detect a one dimensional, two dimensional or multi-dimensional position of an object using capacitive or inductive coupling.

As used herein, the term "light source" is intended to broadly encompass any device or combination of devices capable of providing light. In an exemplary embodiment, light source 206 is made up of one or more light producers 206A-D. Light producers 206A-D are any devices or components capable of providing any type of light, including any fluorescent, incandescent, coherent, stereoscopic, holographic or other source of light. Examples of various light producers 206A-D include light emitting diodes, light bulbs, vertical cavity surface emitting lasers (VCSELs), fiber light sources and/or the like. In one exemplary embodiment, light providers 206A-D are light emitting diodes such as those available from, for example, Agilent Technologies of Palo Alto, Calif. and other suppliers.

Light conductor 208 is any light transmission medium capable of conducting light emitted from one or more light producers 206A-D and/or of scattering light to make the light visible to the user. In various embodiments, light conductor 208 is a "light pipe" formed from plastic, glass or the like. Light pipes are available from, for example, Global Lighting Technologies of Brecksville, Ohio, as well as from Teledyne Lighting and Display Products of Los Angeles, Calif. and many others. Various light conductors and light conducting techniques are described, for example, in Application Brief I-003, "Light Guide Techniques Using LED Lamps" dated Dec. 7, 2001 and available from Agilent Technologies. In various embodiments, light conductor 208 is a custom light pipe that transmits light from light producers 206A-D across a surface of touchpad 102 as appropriate. Although conventional "ideal" light pipes merely transmit light with little or no scattering effect, some or all of light conductor 208 may be designed to be "leaky" in the sense that light is allowed to escape to produce a light effect and thereby alter the appearance of the position sensor using the techniques described above and below. Accordingly, various light conductors 208 may be designed such that portions of the conductor are "ideal" (or approximately ideal, scattering only very small amounts of light), and such that light is otherwise scattered from only a portion of the light conductor to produce the desired effect. In an exemplary embodiment of a touchpad 102, light conductor 208 may be implemented with a glass or plastic light pipe with a thickness on the order of about one millimeter and an area of about 37 mm×50 mm or so to cover the surface of a conventional sensor 204, although light conductors having widely varying dimensions could be constructed in alternate embodiments. Other embodiments of light conductor 208 may include one or more light pipes, one or more optical fibers, step index fibers, prisms, and/or other light transmission media, which may be used in place of or in conjunction with one or more light pipes.

In the exemplary embodiment shown in FIGS. 2A-2B, light conductor 208 is appropriately located between sensor 204 and the sensing region 103 of touchpad 102. Light conductor 208 may overlap either sensor 204 and/or sensing region 103 in whole or in part, and may not be perfectly situated between sensor 204 and sensing region 103 in all embodiments. Nevertheless, because light is brought in front of sensor 204 by light conductor 208, the need to make sensor 204 transparent/translucent is significantly reduced, since light is no longer required to pass through sensor 204 to reach the viewer's eye.

Light conductor 208 may also include one or more scattering elements (not shown in FIGS. 2A-B) for scattering, diffracting and/or dissipating light from light conductor 208, as described more fully below. Light transmitted within light conductor 208 may be scattered from the surface and/or from the bulk of the conductor by providing scattering elements such as protrusions, depressions, textures, materials, gaps, gratings, labels, etchings and/or the like on, in or next to conductor 208. Surface scattering, for example, may be implemented by etching, abrading, embossing, printing or otherwise forming a scattering pattern on a top, bottom, side and/or end face of conductor 208. Similarly, bulk-type scattering could be implemented by placing pockets of plastic, glass, fibers, paint, air or other materials within the volume of light conductor 208, by placing wavelength-sensitive gratings within conductor 208, or by any other technique. By selectively placing scattering elements in a pattern with respect to light conductor 208, light can be scattered from selected portions of conductor 208 to create various visual effects, including the "soft controls" and/or status indicators described below.

Touchpad 102 may also include an optional face sheet 210 to protect the various components of touchpad 102 from moisture, contaminants and the like, and to provide an appropriate touch surface 212 for touch inputs. Face sheet 210 is typically a mostly (but not perfectly) smooth surface to provide users with an appropriate glide feel. In an exemplary embodiment, face sheet 210 is implemented with plastic (e.g. polyester) or any other suitable material. If a face sheet 210 is used, the material should be transparent or translucent such that light from light conductor 208 is able to escape from touchpad 102 to become viewable to the user. In an alternate embodiment, face sheet 210 is omitted entirely and the outer surface of light conductor 208 is appropriately textured to provide a desired touch surface 212 for touch inputs. In a further embodiment, the outer surface of light conductor 208 may be rough or otherwise appropriately textured to simultaneously provide surface light scattering and a desirable touch surface 212 for touchpad 102.

In addition to supporting sensor 204, substrate 202 may also support a processor 214, memory 216 and/or other control circuitry, as best seen in FIG. 2B. The various circuitry components appropriately communicate with sensor 204 using digital or analog electrical signals provided through conventional vias or other electrical connections through or around substrate 202. The particular control circuitry used varies widely from embodiment to embodiment, but in exemplary embodiments processor 214 is a model T1004, T1005, T100X or other microcontroller produced by Synaptics Inc. of San Jose, Calif. Similarly, memory 216 may be implemented with any random access memory (RAM), read only memory (ROM), flash memory, magnetic or optical storage device, or any other digital storage medium. Alternatively, the logical functions of memory 216 may be incorporated into processor 214 such that a physically separate memory device 216 may not be present in all embodiments. In many embodiments, memory 216 suitably stores digital instructions in any software or firmware form that are executable by processor 214 to implement the sensing and control functions described herein.

In operation, sensor 204 is operable to sense user inputs correlating to the position of a finger or other object in proximity to touch surface 212. Sensing region 103 encompasses the volume in which touchpad 102 is able to distinguish the signal effect of the finger or other object from background noise. Objects are detected within sensing region 103 using conventional capacitive, inductive, resistive or other sensing techniques. Alternatively, objects may be detected using temperature, pressure, force, optical energy, acoustic energy or any other parameter. In an exemplary embodiment, object position is sensed in two dimensions (e.g. X and Y coordinates) using conventional capacitive sensing techniques. In such embodiments, digital positional indicia may be provided from processor 214 to computing system 100 (FIG. 1), as appropriate.

Light effects may be produced on touchpad 102 by any technique. In an exemplary embodiment, light producers 206A-D are activated to produce light 218A that propagates through light conductor 208 as appropriate. One or more of light producers 206A-D may be activated upon power up of touchpad 102, in response to control signals from processor 214 or any other source, or according to any other technique. In the embodiment shown in FIG. 2B, light producers 206A-D are spatially arranged to initially direct emitting light away from sensor 204, with reflective edges 220A-B of light conductor 208 reflecting light 218A-D toward the bulk of conductor 208. Light 218 is scattered from conductor 208 according to any surface and/or bulk scattering technique to thereby produce a visible light effect that alters the appearance of touchpad 102, as appropriate.

The various light effects that may be produced from touchpad 102 vary widely from embodiment to embodiment. By controlling the various light producers 206A-D from processor 214 (or computing system 100 or another controller) and/or by designing appropriate scattering elements in proximity to light conductor 208, numerous light effects may be implemented even on a single touchpad 102. Light producers 206A-D may be selectively activated or controlled, for example, to produce desired light effects in response to varying user inputs or status conditions of touchpad 102, and/or to reflect user preferences, on-screen events, processing modes for computing system 100, or the like. Other light effects that may be produced include uniform or non-uniform (e.g. with certain portions lighted more brightly than others) lighting of surface 212 or sensing region 103. Alternatively, one or more light producers 206A-D may be intermittently activated or varied in light intensity to produce a flashing, strobing or other temporal variation effect, or different light producers 206A-D may be selectively activated or controlled to produce light 218 of different colors, wavelengths and/or intensities. Various additional light effects are described more fully below.

Figure 3A:
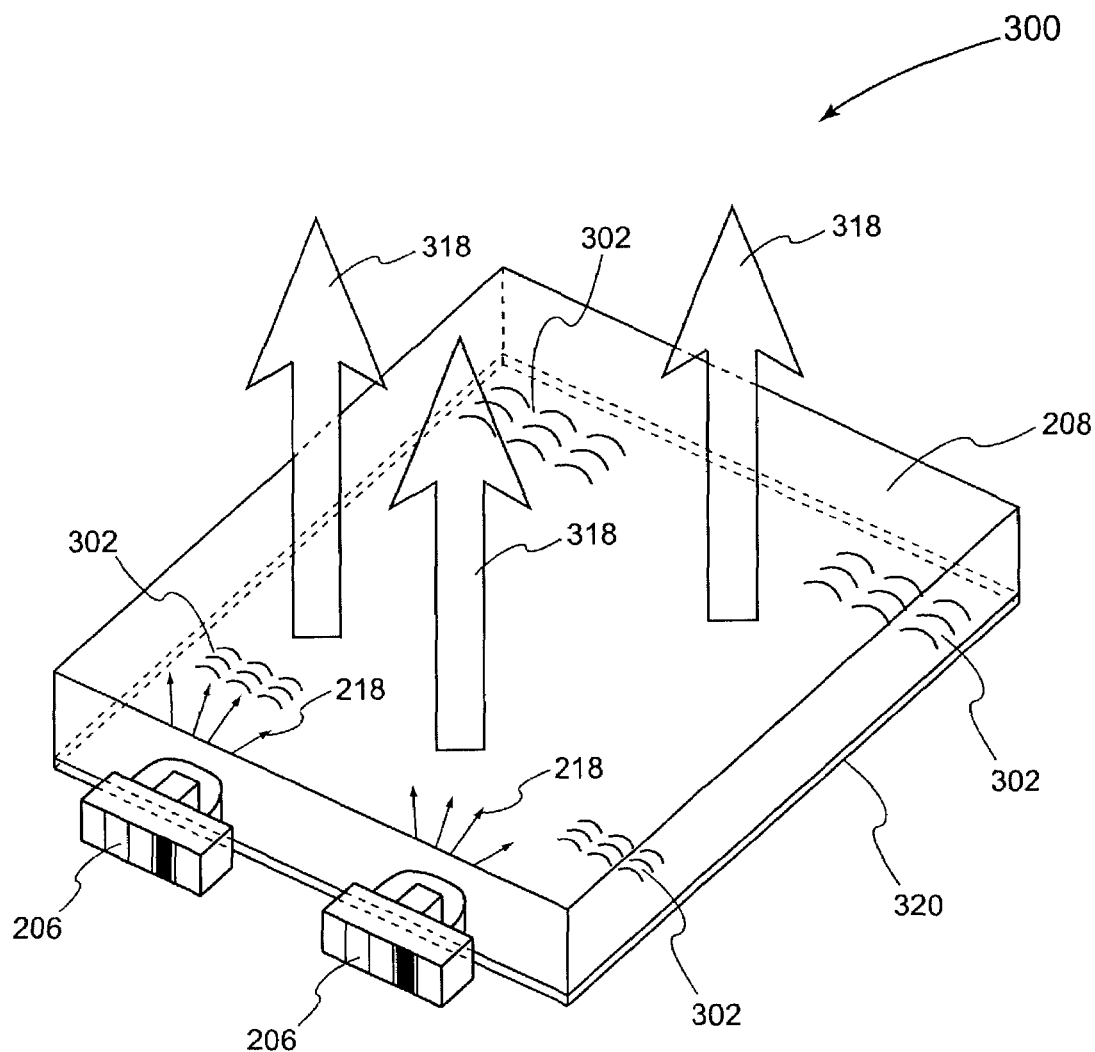
FIG. 3A is a perspective view of an exemplary light transmitting assembly suitable for use with a position sensor.

Light conductor 208 need not be integrally formed within touchpad 102. With reference now to FIG. 3A, an exemplary light conductor assembly 300 that may be integrally formed within a touchpad 102 or provided as a separate assembly suitably includes light sources having one or more light producers in optical communication with a light conductor 208. Light sources 206 shown in FIG. 3A each include a single right angle mount light emitting diode (LED), although other numbers, types and combinations of light producers could be used in alternate embodiments. Light sources 206 suitably produce light 218 that propagates through light conductor 208 and that is scattered by scattering elements 302. Assembly 300 may be provided as an add-on component, for example, to provide light effect functionality to existing touchpad sensors.

Figure 3B:
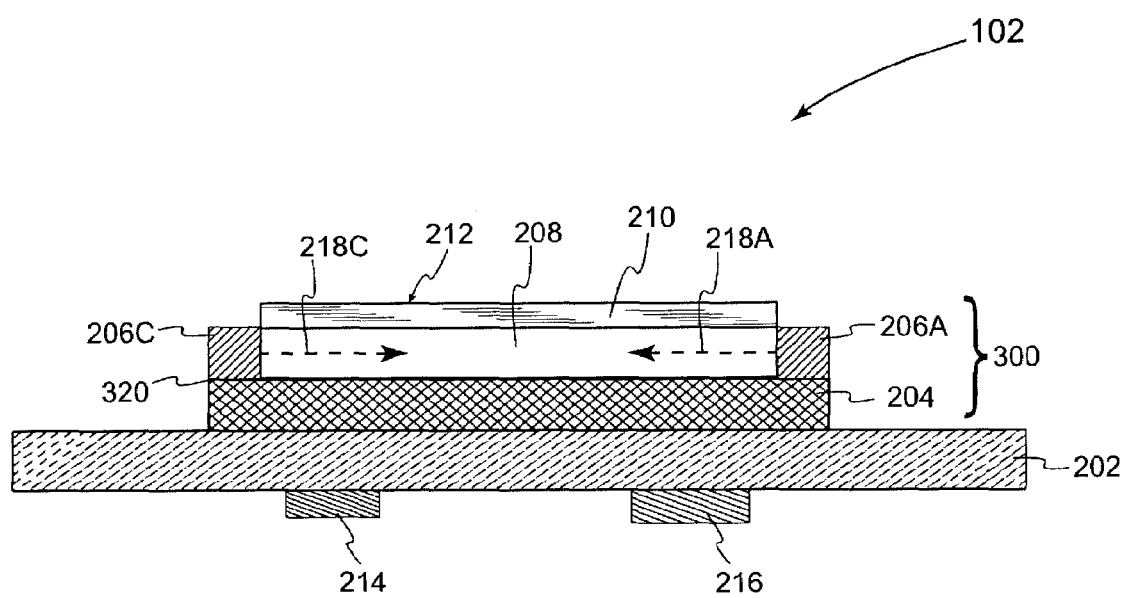
FIG. 3B is a side view of an exemplary position sensor including the light transmitting assembly of FIG. 3A.

In the embodiment shown in FIG. 3A, scattering elements 302 are indentations formed in a bottom surface of conductor 208, although additional or other scattering elements could be used in alternate embodiments. As shown in FIG. 3A, scattering elements 302 are shown to be smaller and/or less densely located near light sources 206, with larger and/or more densely situated scattering elements 302 located further away from light sources 206. Because this arrangement of scattering elements 302 provides the greatest amount of scattering in the portions of conductor 208 where the least amount of light is propagating, the result may be an approximately uniform scattering of light 318 emanating across surface 212 of touchpad 102. An optional reflection sheet 320 may also be provided to further enhance light scattering across light conductor 208, and a face sheet 210 (not shown in FIG. 3A) may also be provided to further enhance the functionality and desirability of assembly 300. FIG. 3B shows an exemplary touchpad 102 that includes light conductor assembly 300 providing light 218 from right-angled light sources 206 to light conductor 208, as appropriate. Again, assembly 300 may not be integrally formed within touchpad 102, but may be attached to sensor 204 using one or more adhesives, mechanical clamps, mechanical fasteners or other suitable attachment techniques.

Figure 3C:
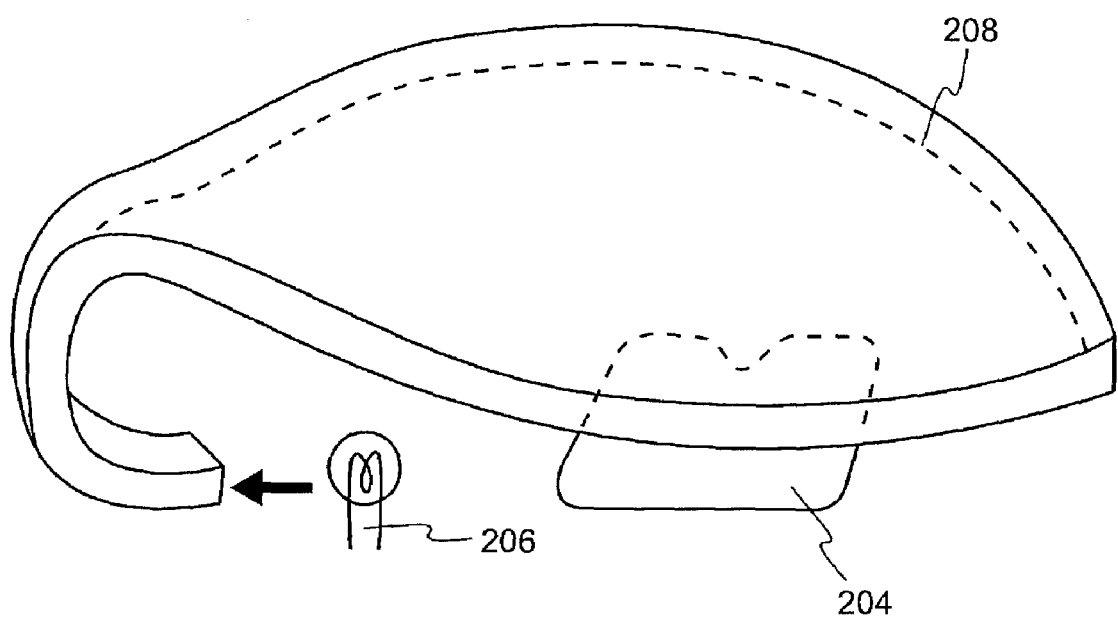
FIG. 3C is a perspective view of an alternate embodiment of an exemplary light conductor.

Further, and with reference now to FIG. 3C, light conductor 208 may be of any shape, and light source 206 may be located in any orientation or position relative to sensor 204. As shown in FIG. 3C, an alternate embodiment of light conductor 208 suitably conducts light from light source 206 to a desired location, surface or area in proximity to sensor 204. This design flexibility allows wide variability in the relative spatial positioning of light source 206 and sensor 204, as well as the other components of various position sensors. Light source 206 may be located, for example, underneath substrate 202, as a separate component from touchpad 102, or in any other suitable location in or near computing system 100. Accordingly, light source 206 need not be integrally formed with touchpad 102.

Figure 4:
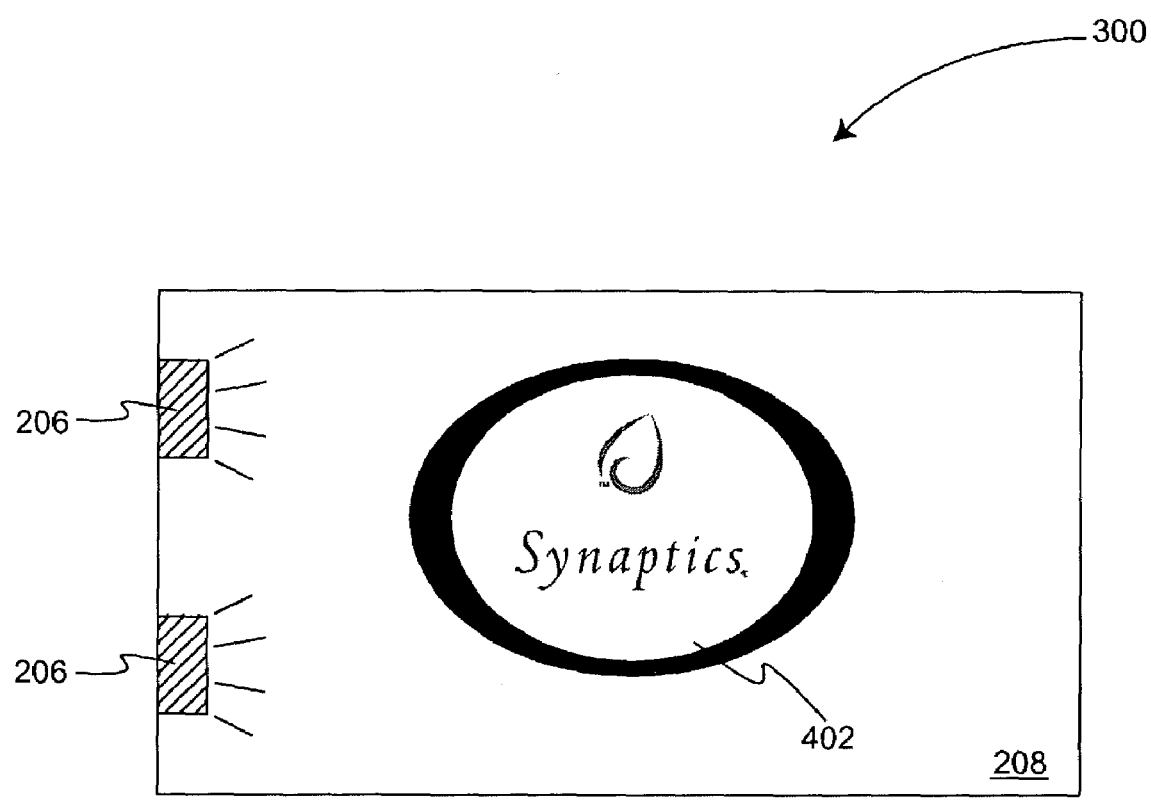
FIG. 4 is a top view of an exemplary light transmitting assembly capable of displaying a logo or other design.

With reference now to FIG. 4, an alternate embodiment of a light conductor assembly 300 suitably includes a logo, status indicator, ornamental design or other pattern 402 in place of or in addition to scattering elements 302 (FIG. 3A). Pattern 402 may be etched, beveled, embossed or otherwise formed in or on any surface of light conductor 208, or may be formed with a label, decal or the like on or near any surface of light conductor 208. Alternatively, pattern 402 may be formed with in the volume of light conductor 208 using air gaps, particulates, bubbles and/or diffraction gratings present in light conductor 208, or by any other technique. As light 218 is produced by one or more light producers (not shown) of light source 206, pattern 402 suitably scatters light such that the logo or other pattern becomes visible to the user. The pattern may be seen, for example, on touch surface 212 (FIG. 2A), or elsewhere within sensing region 103 (FIG. 1) using stereoscopic, holographic or other lighting techniques.

In an exemplary embodiment, pattern 402 is formed with diffraction gratings that are sensitive to a wavelength, polarization or other component of light 218. Alternatively, pattern 402 may be formed in or on light conductor 208 with light-sensitive paint or the like. Examples of light-sensitive paint include phosphorescent paint, fluorescent paint, wavelength-sensitive paint and the like. When the gratings and/or paint are exposed to light 218 having the appropriate properties, at least a portion of the light is scattered, absorbed and/or emitted by the grating and/or paint so that the pattern becomes visible to the user. Further, multiple patterns 402 may be present within various embodiments, with different light producers (not shown) of light source 206 being activated to produce light of differing wavelengths and/or polarizations to illuminate the various patterns at desired times. In this manner multiple patterns 402 may be produced by varying and/or modulating the intensity, frequency, direction, location and/or polarization of light produced by any particular light source 206, or by selectively activating different light sources to produce the desired light effects. Different patterns 402 may include logos, ornamental designs, status indicators and/or "soft controls" that demark particular portions of sensing region 103 for special purposes. These soft controls may include buttons, sliders, character input regions, and the like.

Figure 5:
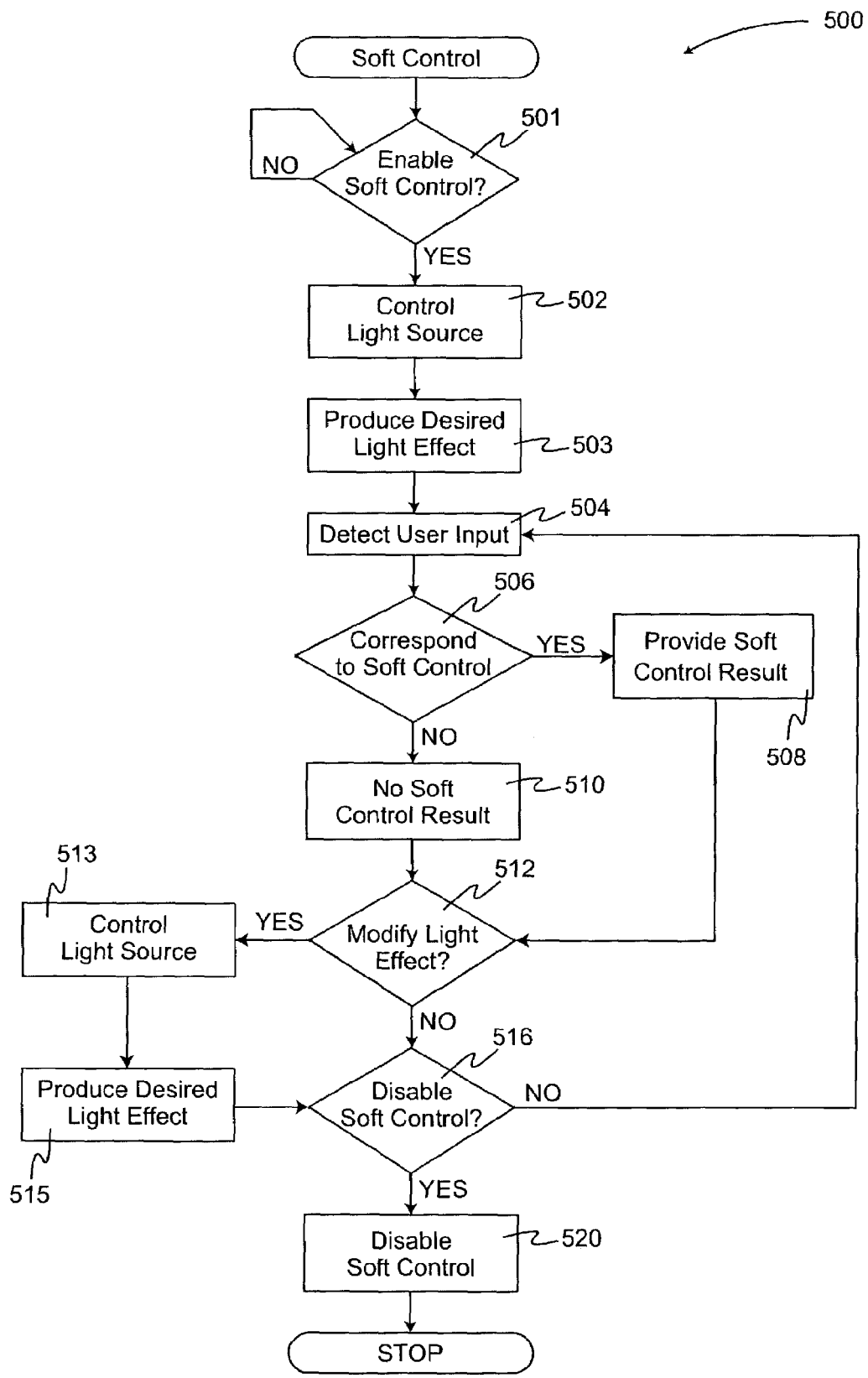
FIG. 5 is a flowchart of an exemplary process for controlling a position sensor.

FIG. 5 is a flowchart of an exemplary process 500 for controlling and operating a position sensor that includes soft control functionality. While many of the functions described in FIG. 5 may be computer-implemented using software or firmware instructions, FIG. 5 is intended to illustrate various exemplary functions in logical form, and is not intended to present a literal implementation of a software routine. Accordingly, the various modules, functions and routines shown in FIG. 5 may be enhanced, eliminated and/or differently organized in the many alternate practical embodiments. The various steps and modules set forth in process 500 may be implemented using any computer language, modules, applications, instructions or the like, and may be stored permanently or temporarily in memory 216 or in any other digital storage medium including a floppy disk, CD-ROM, RAM, ROM, optical or magnetic mass storage device, or the like. The instructions used to implement various portions of process 500 may also be transmitted as modulated signals on carrier waves transmitted across any communications medium such as a digital network, wireless link, or the like.

With reference now to FIG. 5, an exemplary process 500 for controlling a touchpad 102 (FIG. 1A) or other position sensor suitably includes the broad steps of controlling a light source (step 502) to produce an appropriate light effect (step 503), sensing user input corresponding to the position of an object (step 504), processing any soft control functionality (steps 506, 508, 510), modifying the light effect produced (steps 512, 513, 515), and/or disabling the soft control (step 516, 520) as appropriate.

Enabling the soft control (step 501) suitably initiates a process 500 that begins by activating and/or controlling light source 206 as appropriate (step 502). One or more LEDs or other light producers 206A-D (FIGS. 2A-B) may be activated or deactivated, for example, or otherwise controlled to produce a desired light effect (step 503). As described above, light producers 206A-D may be activated via a control signal provided by processor 214 (FIG. 2B), via computing system 100 through I/O interface 106 (FIG. 1), or by any other technique. Each of the light producers 206A-D present in a particularly embodiment may be activated in response to any stimulus, including a user selection of an operating mode for touchpad 102, an event occurring within an application executing on computer system 100 (FIG. 1), a particular input received by sensor 204 (FIGS. 2A-B, 3B), or the like.

Step 502 may also include providing light or light components with a desired wavelength, polarization and/or intensity to produce a desired light effect on touchpad 102 (step 503). Various forms of gratings, paint and/or scattering elements are sensitive to particular wavelength components, polarization components and/or locations of the light produced, such that certain patterns appear near light conductor 208 only when light of the appropriate parameters is produced. Light components may be varied in any manner, including by controlling a variable-input light source to modulate the intensity, frequency, color or another component of light produced, or by activating and/or deactivating one or more light producers in different positions or capable of providing light having the appropriate parameters to produce the desired light effects. To activate a soft control, for example, tuned diffraction gratings and/or light-sensitive paint may be used to create a pattern 402 defining the control. When light of the particular characteristics is produced, the soft control becomes visible in sensing region 103.

Detecting a user input (step 504) suitably involves obtaining position-related information about the object at sensor 204. The position may be sensed and processed using, for example, conventional position sensing techniques such as those set forth in U.S. Pat. No. 5,880,411, referenced above. In a capacitive position sensor, for example, capacitive coupling between sensor 204 and the object in the sensing region remains possible even when light conductor 208 is disposed between sensor 204 and the object 104 being sensed. In other embodiments, position-related information may be obtained using inductive techniques, resistive techniques or the like. Positional information may be obtained in one or more directions using any conventional technique presently known or subsequently developed.

In an exemplary embodiment, touchpad 102 returns a unique result to computing system 100 if the user's input corresponds to an enabled soft control (step 506). Activating a soft button, for example, may result in a particular response from touchpad 102 and/or computing system 100. Soft controls may include buttons, sliders, character or gesture recognition regions, biometric observation regions, or the like. In an exemplary embodiment, a soft button is provided on a portion of a touchpad 102 to perform a task (e.g. open an application) on system 100. If the user's finger (or other object sensed) is identified in the soft control portion of sensing region 103, then an appropriate result may be provided (step 508) to computing system 100 to indicate that the "button" has been activated. Conversely, the portions of touchpad 102 outside of the soft control may retain conventional pointing functionality, so inputs outside of the soft control pattern 402 appropriately result in no soft control results (e.g. conventional positional outputs) being provided to computing system 100 (step 510).

In various embodiments, the sensed position of the object may be used to modify the light effect produced (steps 512, 513, 515). If the light effect is to be modified (step 512), light source 206 is appropriately controlled (step 513) to produce the desired effect (step 515), as described above. Touching or tapping a soft control button, for example, may activate a light effect that reveals another set of soft controls. Alternatively, the light effect could simply be flashed, the color of the light could be changed, or any other light effect could be produced (step 515). In one embodiment, touchpad 102 may be used to estimate the pressure of a touch on touch surface 212. Pressure is sensed, for example, by tracking changes in the surface area of touch surface 212 that is in contact with a user's finger, since greater pressure typically results in increased deformation of the user's finger, and therefore a greater surface area touched. This information could be used to vary the color of the light effect, for example, or to produce a light effect only on the portion of touch surface 212 that is in contact with the user's finger. Further, the position, brightness, color or other aspect of the effect could be adjusted as a function of and/or in response to the sensed position of the object. As such, a wide array of light effects could be produced in various alternate embodiments. Moreover, light effects could be modified (step 514) in response to stimuli other than user input. Data received from computing system 100 or any other external source, for example, could be used to place touchpad 102 into a desired input mode with a corresponding light effect, visible pattern 402 and/or set of soft controls. Some or all light producers of light sources 206 may be further deactivated (steps 516, 520) in response to positional information or external factors (e.g. system status, etc.) as appropriate. Feedback to the user could also be provided from display 114 (FIG. 1), an audio speaker associated with touchpad 102 or computing system 100 (FIG. 1), and/or any other source. In an embodiment that provides soft control buttons corresponding to the buttons of a calculator, for example, an audible sound from computing system 100 could be produced to indicate that the user had activated a soft button. Many other types of feedback may be produced, and will vary widely from embodiment to embodiment.

Soft controls may be disabled using any technique (steps 516, 520). In an exemplary embodiment, a user taps a soft button or otherwise activates a soft control. In another exemplary embodiment, computing system 100 instructs touchpad 102 to disable the soft control.

Figure 6A:
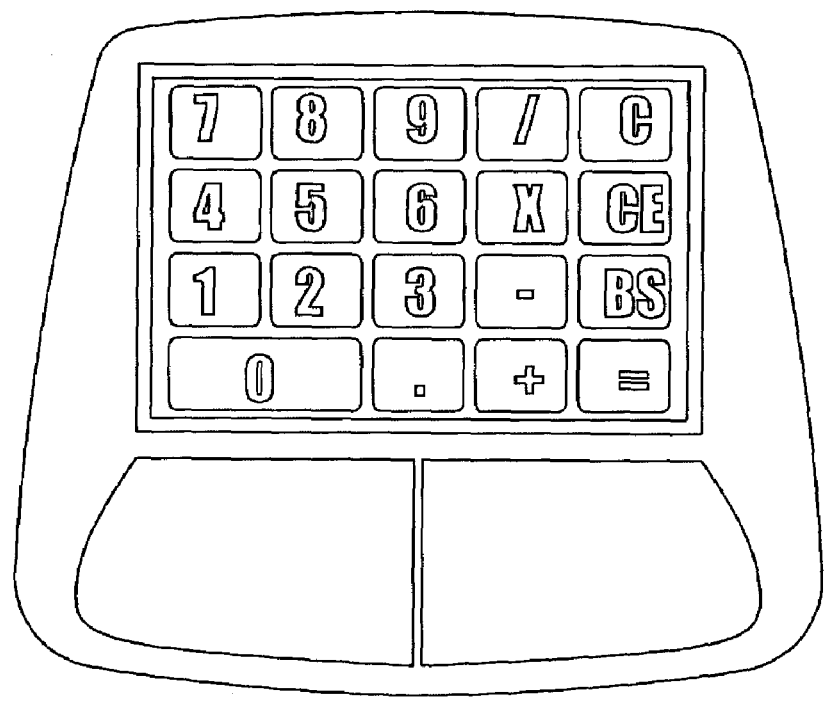
FIGS. 6A-B are perspective views of exemplary soft control implementations of a calculator and media player, respectively.
Figure 6B:
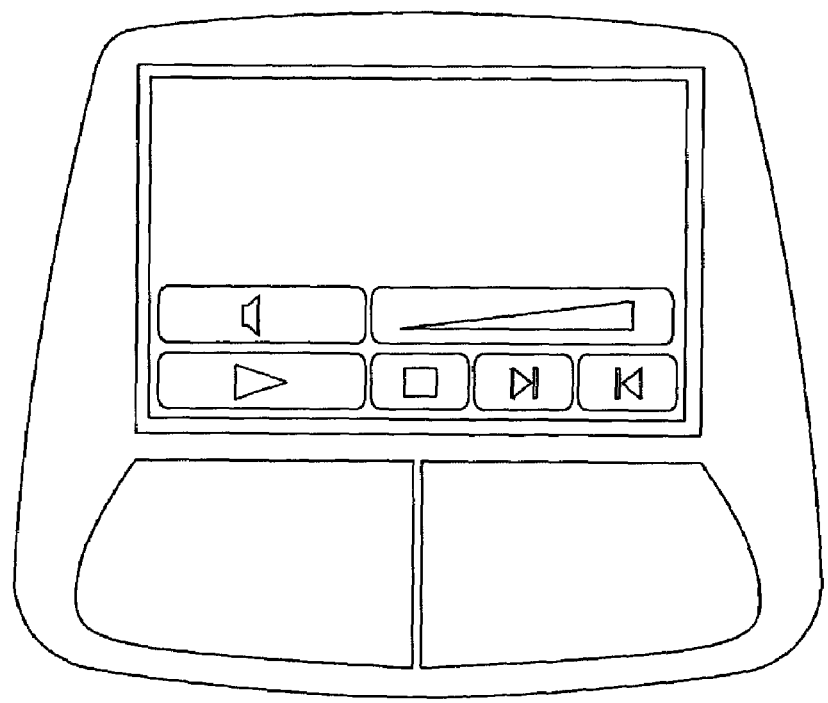

Exemplary implementations of touchpads 102 having soft controls are shown in FIGS. 6A and 6B, respectively. FIG. 6A shows an exemplary calculator implementation with various soft buttons corresponding to the various calculator functions. FIG. 6B shows an exemplary media player implementation whereby soft controls are used to play, pause, forward or reverse the media being played, as appropriate, and/or to implement a volume slider and/or other controls. As shown in FIGS. 6A-B, multiple soft controls may be placed on a single touchpad 102, and indeed multiple sets of soft controls may be activated at different times using the grating and/or wavelength/polarization sensitivity techniques described above, by activating different light providers 206A-D, or by any other technique. As mentioned above, light effects produced on a touchpad 102 are not limited to soft controls, but may alternatively include variations in light color or intensity, status indicators, ornamental designs, logos and the like.

Accordingly, there are provided numerous systems, devices and processes for producing light effects that alter the appearances of touchpads and other position sensors. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiments. It should be understood that various changes can be made in the function and arrangement of elements without departing from the scope of the invention as set forth in the appended claims and the legal equivalents thereof.

What is claimed is:

1. A position sensor for detecting a position of an object near a touch surface comprising:
    an opaque capacitive proximity sensor configured to sense the position of the object in a sensing region based on a conductive property of the object;
    a controller configured to operate in a first mode and a second mode coupled to the opaque sensor, wherein the controller is configured to produce a first output in response to sensing the object in the sensing region when operating in the first mode, and to produce a second output different from the first output in response to sensing the object in the sensing region when operating in the second mode;
    a light source coupled to the controller; and
    a light conductor coupled to the light source and at least partially disposed over the opaque sensor, wherein the light conductor is configured to transmit at least a portion of a light from the light source to produce a first light effect in the sensing region when the controller is operating in the first mode and to produce a second light effect different from the first light effect in the sensing region when the controller is operating in the second mode.

2. The position sensor of claim 1 wherein the light conductor is further configured to scatter at least a portion of the light when the controller is operating in the second mode.

3. The position sensor of claim 2 wherein the light conductor has a first surface and the portion of the light is scattered at the first surface of the light conductor.

4. The position sensor of claim 3 wherein the light conductor has a second surface and the portion of the light is also scattered at the second surface of the light conductor.

5. The position sensor of claim 2 wherein the portion of the light is scattered from within the volume of the light conductor.

6. The position sensor of claim 2 wherein the light conductor comprises a grating configured to diffract the portion of light.

7. The position sensor of claim 6 wherein the grating is configured to diffract a pre-determined wavelength of the light.

8. The position sensor of claim 1 wherein the second light effect is a viewable pattern configured to become visible in response to the light.

9. The position sensor of claim 8 wherein the pattern is an ornamental design.

10. The position sensor of claim 8 wherein the pattern demarks a control.

11. The position sensor of claim 8 wherein the pattern is a status indicator.

12. The position sensor of claim 1 wherein the first output simulates activation of a button.

13. The position sensor of claim 12 wherein the second output is positional output.

14. The position sensor of claim 1 further comprising an overlay proximate the light conductor.

15. The position sensor of claim 14 wherein the overlay comprises a light-emitting portion corresponding to the sensing region that allows light to be passed through the overlay.

16. The position sensor of claim 15 wherein the light-emitting portion comprises an aperture.

17. The position sensor of claim 15 wherein the light-emitting portion comprises a transparent portion of the overlay.

18. The position sensor of claim 15 wherein the light-emitting portion comprises a translucent portion of the overlay.

19. The position sensor of claim 14 wherein the overlay comprises a first portion corresponding to the sensing region that blocks the passage of light proximate to a portion of the sensing region that allows the passage of light.

20. A touch sensor for detecting a position of an object near a touch surface, the touch sensor configured to function in a first operational mode and a second operational mode, the touch sensor comprising:
    an opaque capacitive position sensor, the opaque sensor configured to sense the position of the object when the object is proximate to a sensing region based on a conductive property of the object;
    a light source configured to be selectively switched ON and OFF;
    a light conductor coupled to the light source and at least partially disposed over the opaque sensor, wherein the light conductor is configured to transmit at least a portion of a light from the light source to the opaque sensor to produce a light effect in the sensing region when the light source is ON; and
    a controller coupled to the opaque sensor and the light source, wherein the controller is configured to produce a first output in response to sensing the object in the sensing region when the touch sensor is operating in the first operational mode and to produce a second output different from the first output in response to sensing the object in the sensing region when the touch sensor is operating in the second operational mode, and wherein the controller is configured to switch ON the light source when the touch sensor is operating in the first operational mode and to switch OFF the light source when the touch sensor is operating in the second operational mode.

21. A system having a processor, a digital memory and an input/output sub-system configured to communicate with a touchpad configured to receive user input near a touch surface, wherein the touchpad comprises:
    an opaque capacitive position sensor configured to sense user input based on a conductive property of an object associated with the user input;
    a light source configured to produce a light;
    a light conductor located over the opaque sensor, wherein the light conductor is configured to transmit the light from the light source to produce a light effect near the touch surface; and
    a controller configured to operate in a first mode and a second mode coupled to the opaque sensor, wherein said light effect is produced when the controller is operating in the first mode and said light effect is altered when the controller is operating in the second mode, and wherein the controller is further configured to produce a first output in response to user input when the controller is operating in the first mode and to produce a second output different from the first output in response to user input when the controller is operating in the second mode.

22. The system of claim 21 wherein said light effect is altered by turning off the light source when the position sensor is operating in the second mode.

23. The system of claim 21 wherein said light effect is altered by changing one of a color of the light and a pattern produced by the light when the position sensor is operating in the second mode.

24. The system of claim 23 wherein the altered light effect is different from said light effect.

25. A method of operating a device having an opaque capacitive position sensor and a touch surface, the opaque capacitive position sensor configured to detect a position of an object in a first mode and a second mode based on a conductive property of the object, the method comprising the steps of:

setting the opaque capacitive position sensor to operate in one of the first mode and the second mode;

receiving user input;

responsive to operating in the first mode:
 activating a light source to thereby produce a light,
 transmitting at least a portion of the light from the light source with a light conductor, wherein the light conductor is located at least in part over the sensor;
 scattering at least a portion of the light from the light conductor to thereby produce a first light effect that changes an appearance of the device, and wherein the first light effect is produced in the first mode and the first light effect is not produced in the second mode, and
 producing a first output in response to receiving the input; and responsive to operating in the second mode:
 not activating the light source, and
 producing a second output different from the first output in response to receiving the input.

26. The method of claim 25 wherein the scattering step comprises uniformly producing the light effect across a sensing region of the capacitive position sensor.

27. The method of claim 25 wherein the scattering step comprises non-uniformly producing the light effect across a sensing region of the capacitive position sensor.

28. The method of claim 25 wherein responsive to operating in the first mode further comprises the step of adjusting the first light effect.

29. The method of claim 28 wherein the adjusting step comprises varying the intensity of the light.

30. The method of claim 28 wherein the adjusting step comprises varying the color of the light.

31. The method of claim 28 wherein the adjusting step comprises dynamically adjusting the light effect as a function of the input received by the sensor.

32. The method of claim 28 wherein the adjusting step comprises adjusting the light effect as a function of the position of an object sensed by the sensor.

33. The method of claim 28 wherein the step of adjusting the light effect is in response to a status of the device.

34. The method of claim 28 wherein the step of adjusting the first light effect produces a second light effect in the first mode different from the first light effect.

35. The method of claim 28 wherein the adjusting step is performed responsive to receiving the input if the input is received when the sensor is operating in the first mode.

36. A device comprising:
 opaque means for capacitively sensing an object position in proximity to a surface based on a conductive property of an object;
 means for producing light;
 means for conducting the light from the light producing means, wherein the conducting means is located at least in part between the sensing means and the surface; and
 means for scattering at least a portion of the light from the conducting means to thereby produce a light effect that changes an appearance of the device, wherein the device is configured to operate in a first mode and a second mode different from the first mode, and wherein said light effect is produced in the first mode and said light effect is not produced in the second mode.

37. A position sensing device having a touch surface, the sensing device comprising:
 an opaque capacitive position sensor configured to detect user input received near the touch surface based on a conductive property of an object associated with the user input;
 a light source configured to produce a light;
 a light conductor located at least in part over the sensor wherein the light conductor is configured to transmit the light from the light source;
 at least one marking in proximity to the light conductor, wherein the at least one marking is configured to be made visible by at least a component of the light to produce an image of a first soft control indicating an associated portion of the sensing region; and
 a controller coupled to the sensor, wherein the controller is configured to operate in a first soft control mode to produce the image of the first soft control and to provide a first soft control result when user input corresponds to the associated portion of the sensing region, and to provide a result different from the first soft control result when user input corresponds to the associated portion of the sensing region and the device is not operating in the first soft control mode.

38. The sensing device of claim 37 wherein the at least one marking comprises at least one diffraction grating sensitive to a wavelength component of the light.

39. The sensing device of claim 37 wherein the at least one marking comprises material sensitive to a wavelength component of the light.

40. The sensing device of claim 37 wherein the at least one marking is proximate to a surface of the light conductor.

41. The sensing device of claim 37 wherein the at least one marking is located within the volume of the light conductor.

42. The sensing device of claim 37 wherein the light source is further configured to be switchably activated to produce the component of the light.

43. The sensing device of claim 37 wherein the controller is configured to operate in a second soft control mode, the position sensing device further comprising a second marking in proximity to the light conductor, wherein the second marking is configured to be made visible in response to a second component of the light to produce a second image of a second soft control.

44. The sensing device of claim 43 wherein the component of the light comprises light of a first wavelength, and the second component of the light comprises light of a second wavelength different from the first wavelength.

45. The sensing device of claim 43 wherein the component of the light comprises light of a first polarization, and the second component of the light comprises light of a second polarization different from the first polarization.

46. The sensing device of claim 43 wherein the component of the light comprises light of a first intensity, and the second component of the light comprises light of a second intensity different from the first intensity.

47. The sensing device of claim 43 wherein the component of the light is produced by a first light producer, and the second component of the light is produced by a second light producer different from the first light producer.

48. The sensing device of claim 47 wherein the first and second light producers are light emitting diodes.

49. The position sensing device of claim 37 wherein the at least one marking is not visible in the absence of the component of the light.

50. The position sensing device of claim 37 wherein the at least one marking is at least partially visible in the absence of the component of the light.

51. The position sensing device of claim 37 wherein the component of the light alters the appearance of the at least one marking.

52. A method of controlling a position sensing device having a light source configured to produce a light, an opaque position sensor having a sensing region for detecting user input correlating to a position of an object based on a conductive property of the object, and a light conductor located at least in part between the sensor and the object and configured to transmit light from the light source to the sensing region, wherein the device is capable of operating in a first input mode and in a second input mode, the method comprising the steps of:
    demarking a soft control portion of the capacitive sensing region when the device is in the first input mode and not demarking the soft control portion of the capacitive sensing region when the device is in the second input mode; and
    producing a first result if the user input corresponds to the soft control portion and the device is in the first input mode, and producing a second result different from the first result if the user input corresponds to the soft control portion and the device is in the second input mode.

53. A digital storage medium having computer-executable instructions stored thereon, wherein the instructions are configured to execute the method of claim 52.

54. A digital storage medium having computer-executable instructions stored thereon for controlling a sensing device having a light source configured to produce a light, an opaque position sensor having a capacitive sensing region for detecting user input correlating to a position of an object based on a conductive property of the object, and a light conductor located at least in part between the sensor and the object and configured to transmit light from the light source to the sensing region, wherein the device is capable of operating in a first input mode and in a second input mode, the instructions comprising:
    a first code module configured to demark a soft control portion of the capacitive sensing region when the device is in the first input mode and to not demark the soft control portion of the capacitive sensing region when the device is in the second input mode;
    a second code module configured to detect user input to determine the position of the object; and
    a third code module configured to produce a first result if the position of the object corresponds to the soft control portion and the device is in the first input mode, and to produce a second result different from the first result if the position of the object corresponds to the soft control portion and the device is in the second input mode.

55. A digital storage medium having computer-executable instructions stored thereon for operating an opaque capacitive position sensor having a light source and configured to detect a position of an object based on a conductive property of the object, and a light conductor at least partially located between the capacitive position sensor and the object, wherein the instructions comprise a code module configured to control the light source to thereby modify a light effect that alters an appearance of the capacitive position sensor in a first operating mode and not in a second operating mode, and wherein the instructions further comprise code configured to process inputs from the sensor to generate a first output in the first operating mode and a second output different from the first output in the second operating mode.

* * * * *